Figure 1:
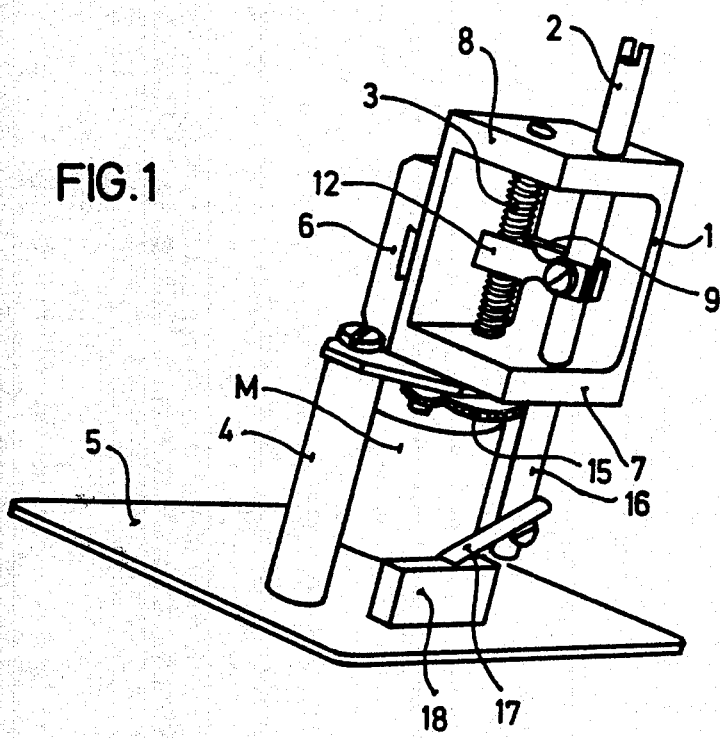

United States Patent [19]

Schoettle et al.

[11] 4,333,116
[45] Jun. 1, 1982

[54] POSITIONING DEVICE FOR A MAGNETIC HEAD OF A MAGNETIC TAPE RECORDER

[75] Inventors: Klaus Schoettle, Heidelberg; Eduard Kaemmer, Mutterstadt; Peter Dobler, Ludwigshafen; Lothar Gliniorz, Frankenthal; Werner Hoffmann, Ludwigshafen, all of Fed. Rep. of Germany

[73] Assignee: BASF Aktiengesellschaft, Ludwigshafen, Fed. Rep. of Germany

[21] Appl. No.: 143,488

[22] Filed: Apr. 24, 1980

[30] Foreign Application Priority Data

May 4, 1979 [DE] Fed. Rep. of Germany ....... 2918020

[51] Int. Cl.³ .................. G11B 21/08; G11B 3/04; G11B 17/32
[52] U.S. Cl. .................. 360/78; 360/103; 360/109
[58] Field of Search ............. 360/75, 78, 102, 103, 360/106, 77, 109; 274/1 J, 13 R

[56] References Cited

U.S. PATENT DOCUMENTS

| 3,271,034 | 9/1966 | Andrews | 179/100.2 |
| 3,485,959 | 12/1969 | Roys | 360/106 |
| 3,539,191 | 11/1970 | Yamamoto | 360/109 |
| 3,601,409 | 8/1971 | Marshall | 274/4 |
| 3,641,279 | 2/1972 | Ganske | 274/4 |
| 3,758,120 | 9/1973 | Kato | 274/4 J |
| 3,769,464 | 10/1973 | Kawata | 179/100.25 |
| 3,839,737 | 10/1974 | Vogel | 360/106 |
| 3,969,768 | 7/1976 | Ebbing | 360/103 |
| 3,973,272 | 8/1976 | Morgan | 360/103 |
| 4,055,849 | 10/1977 | Hickok | 360/77 |

OTHER PUBLICATIONS

W. L. Dollenmayer–"Backspacing Mechanism"–IBM Tech. Disc. Bulletin, vol. 7, No. 6 (pp. 510–511) Nov. 1964.

Primary Examiner—Robert M. Kilgore
Attorney, Agent, or Firm—Keil & Witherspoon

[57] ABSTRACT

A positioning device for a magnetic head of a magnetic tape recorder, comprising a head carrier which can be moved transversely of the magnetic tape by means of a threaded spindle and a follower, the head carrier being provided with a signal transducer for controlling the drive motor for the threaded spindle.

3 Claims, 3 Drawing Figures

POSITIONING DEVICE FOR A MAGNETIC HEAD OF A MAGNETIC TAPE RECORDER

The present invention concerns a positioning device for a magnetic head of a magnetic tape recorder, comprising a head carrier movable by means of a threaded spindle transversely of the magnetic tape; guide and holding means for the head carrier and the threaded spindle, mounted on a baseplate; and a controlled drive for the threaded spindle.

German Published application DAS No. 2,017,894 discloses a positioning mechanism in which two magnetic heads arranged on a turntable are coupled with the rotation of the turntable by means of a threaded spindle and can be radially displaced along the same line. For this purpose, the threaded spindle is connected to the axis of the turntable by means of gear wheels. A roller of truncated-cone shape mounted on an arm linked to the magnetic heads engages the thread of the spindle.

A spindle drive mechanism of this type is suitable for the continuous positioning of magnetic heads, for example in the case of recording disks with spiral tracks, but not for the stepwise movement of a magnetic head for accurately locating it above a preselected track on a multi-track magnetic tape, since, due to the backlash between the roller and the spindle thread and also between the gear wheels, the head-positioning accuracy necessary in view of the narrow track width cannot be achieved. Furthermore, wearing of the drive components affects the head-positioning accuracy.

An object of the invention is therefore to provide a positioning device for a magnetic head of a tape recorder of the type referred to in which the spindle drive mechanism is designed in such a way that for multi-track recording on magnetic tape the magnetic head can always be accurately aligned with one of the tracks, a fixed reproducible correlation between the displacement of the magnetic head and the rotary steps of the spindle drive, controlled by a control system, always being ensured.

This object is achieved according to the invention by mounting on the head carrier a follower and a leaf spring which embrace the threaded spindle, providing the follower with a wedge-shaped end portion which is caused to engage the thread of the threaded spindle by the force of the leaf spring, the angle of the wedge tip being slightly larger than the angle between the flanks of the thread, and providing the head carrier, for signalling its position, with at least one signal transducer which is associated with a signal receiver, the output signal of which controls, via a conventional evaluation and control circuit, a stepping motor for driving the head carrier.

In a preferred embodiment of the positioning device, the signal transducer is a magnet which acts upon a Hall generator in the control circuit.

Such a control circuit for the stepping motor for the accurate positioning of the magnetic head, mounted on the head carrier, relative to a track consists of two capacitors, connectable to the magnetic head via a changeover switch, for storing two consecutive read voltages, and of a differential amplifier which, according to the polarity of a voltage difference, forms a digital voltage step, the said amplifier being connected to the two capacitors on the input side and to the control input of the stepping motor on the output side, so that the sense of rotation of the said motor can be controlled in dependence on the direction of movement of the magnetic head relative to the track position.

Owing to the way in which the follower is guided on the threaded spindle according to the invention, there is obtained in a simple manner a displacement mechanism for the head carrier which is free from play and self-adjusting. The correlation stipulated according to the object of the invention is thus guaranteed throughout the entire operational life of the positioning device. Besides, the linear contact between the wedge-shaped end portion of the follower and the thread produces less friction in transmitting movement than conventional spindle drives.

Figure 3:
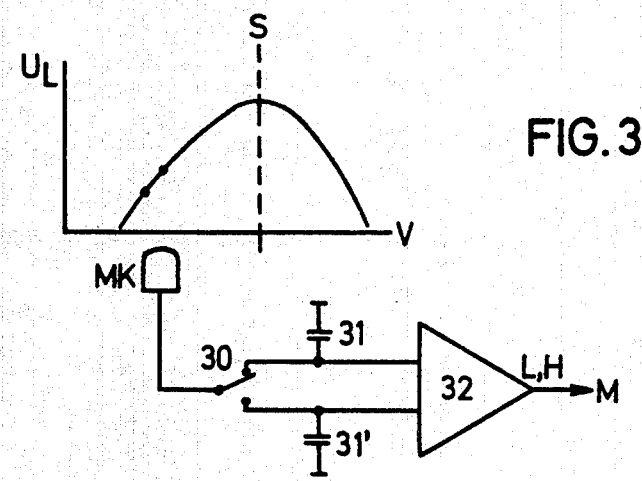
Figure 2:
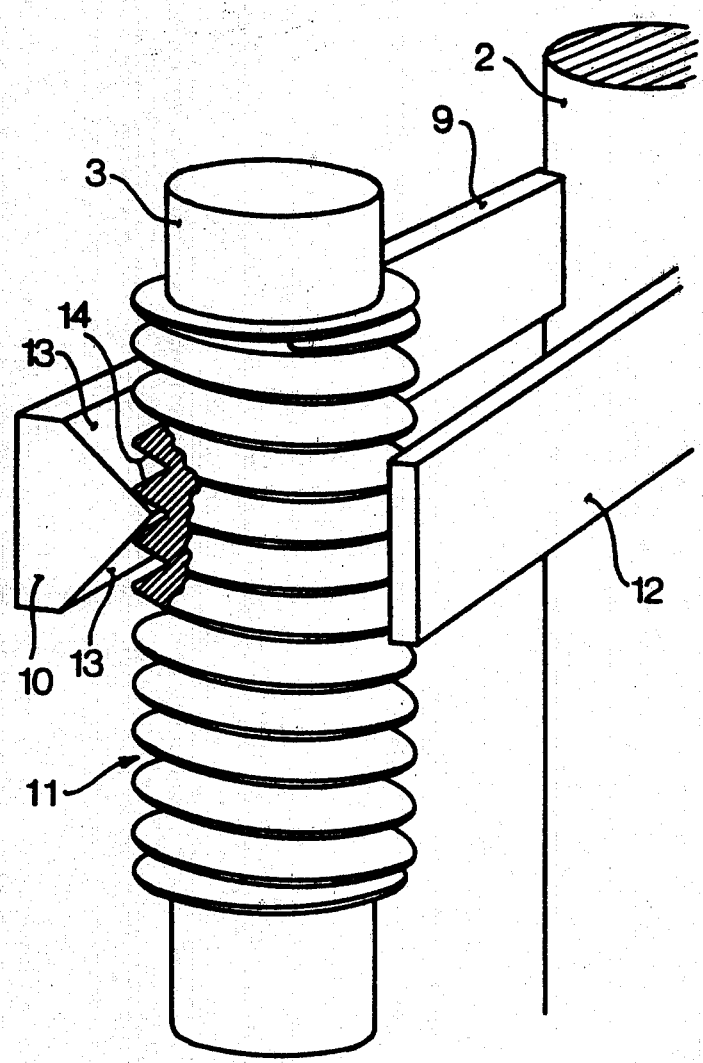

Further details of the invention are disclosed in the following description of an embodiment of the positioning device illustrated in the accompanying drawings, in which FIG. 1 is a schematic perspective view of the positioning device, FIG. 2 is a schematic perspective view, partly broken away of the drive spindle mechanism, and FIG. 3 is a circuit diagram of the head carrier drive control.

As can be seen from FIG. 1, a bearing member 1 for the head carrier 2 and the threaded spindle 3 is fastened to a baseplate 5 via a spacer 4 and to a locating member 6 by means of screws. With the aid of the locating member, the entire positioning device can be pushed into a multi-track magnetic tape recorder, not shown here, and fixed in position by fixing means, for example clamp screws, on the recorder.

In the walls 7 and 8 of the bearing member, the head carrier 2 in the form of a cylindrical rod is displaceably mounted and the threaded spindle 3 is rotatably mounted. The head carrier serves to move and align the magnetic head (not shown) relative to the individual tracks of a multi-track recording on magnetic tape. The head carrier 2 is driven by the threaded spindle 3 via a follower 9 fastened to the head carrier. For this purpose, the follower is provided at its free end with a wedge-shaped projection 10 (FIG. 2) which engages the thread 11 of the threaded spindle 2. In order to make the projection 10 constantly engage the thread of the spindle, a leaf spring 12 is arranged opposite and parallel to the follower 9 and bears against the threaded spindle 3.

As FIG. 2 shows more clearly, the angle of the wedge tip is somewhat larger than the angle formed by the flanks 14 of the thread in contact with the wedge surfaces 13, the playfree transmission of forces thus being achieved. Moreover, owing to the fact that the wedge-shaped projection 10 is inevitably positioned symmetrically in the thread, a spindle drive of this type is self-adjusting and thus not affected by wear.

The threaded spindle 3 is provided with an extension at its lower end which is connected directly or via gearing to the shaft 15 of a stepping motor M. The stepping motor M is located between the bearing member 1 and the baseplate 5 and is mounted on the latter.

The head carrier 2 is also provided with an extension 16 at its lower end. The end of this extension carries a small permanent magnet 17 which acts as signal transducer which signals that the magnetic head is in a certain position, for example over the first track. The signal receiver is a Hall generator 18, mounted on the baseplate 5, the output voltage of which, as is well known, varies as the permanent magnet 17 on the head carrier 2 approaches it. By means of an operational amplifier connected to the Hall generator 18, a transient signal pulse is produced in dependence on a certain threshold of the output voltage and thus in dependence on a certain position of the head carrier, by means of which pulse the electronic switch of the stepping motor M is blocked and the motor thus stopped. Such a functional and electrical combination of a Hall generator and an operational amplifier is known in the trade as a "magnetic proximity switch". Obviously, other switching means, for example optical, mechanical or capacitive switches, may also be used.

In the way just described, the magnetic head can be brought into its initial position, preferably over the first track, with sufficient accuracy.

The magnetic head is moved into position over a preselected track by a number of rotary steps—determined by a control unit, e.g. a microprocessor—of the motor M which moves the head carrier 2 via the mechanism described. The circuitry for operating the stepping motor is well known to those skilled in the art and is therefore not described here in further detail.

For the purpose of exactly aligning the magnetic head with the preselected track, the invention provides (as shown diagrammatically in FIG. 3) for two read voltages $U_L$ induced by the magnetic recording on the said track in the magnetic head MK during the displacement V toward or away from the track center S to be successively stored in capacitors 31 and 31' respectively. To this end, the two capacitors are successively connected to the magnetic head by means of an electronic switch 30, operated by the microprocessor. A differential amplifier 32, connected to these capacitors, forms an output signal from the difference between the capacitor voltages which assumes one of the two conditions (L, H) customary in digital technology, depending upon the polarity of the difference and thus upon the direction of movement of the magnetic head relative to the track center. The output of differential amplifier 32 is connected to the control input of the stepping motor M, so that the latter's sense of rotation can be controlled by the digital output signal of the differential amplifier. Once the track center has been reached with the above-described control mechanism, hunting about the track center will occur, in accordance with the control principle employed.

In prolonged tests with the new positioning device it was found that signals recorded on an 8 mm tape (track spacing 150 μm; track width 100 μm) could be detected with an accuracy of ±7 μm, frequent track changes being made.

We claim:

1. In a positioning device for a magnetic head of a tape recorder, comprising a threaded spindle, a head carrier, and follower means and a cooperating leaf spring attached to said carrier, said threaded spindle driving said carrier by way of said follower means so that the head moves in the plane of the tape, the follower means being provided at their free end with a wedge-shaped portion and the leaf spring causing the wedge-shaped end portion to engage the thread of the spindle, the improvement that said follower means is in the form of a single wedge-shaped follower the angle of the wedge tip of which is larger than the angle formed by the flanks of the thread of the spindle, whereby wear and tear is reduced and the positioning accuracy increased.

2. In a positioning device the improvement as claimed in claim 1, wherein the spindle and the head carrier are mounted in a frame including two parallel platforms mounting the carrier for sliding movement in a direction parallel to the axis of the spindle.

3. A positioning device for a magnetic head of a tape recorder, comprising a head carrier which can be moved transversely of the magnetic tape, a baseplate with guide and holding means for the head carrier, a threaded spindle which can be driven by a stepping motor, a follower and a leaf spring, both attached to the head carrier, the follower being provided at its free end with a wedge-shaped portion, this end portion and the leaf spring embracing the threaded spindle in such a way that the wedge-shaped end portion is caused to engage the thread of the spindle by the force of the leaf spring, and the angle of the wedge tip being slightly larger than the angle formed by the flanks of the thread of the spindle, at least one signal transducer mounted on the head carrier, for signalling its position, and a signal receiver connected to the input of a control circuit whose output signal controls the stepping motor, wherein the signal transducer is a magnet which acts upon a Hall generator of the control circuit, and wherein the control circuit for the stepping motor for the accurate positioning of the magnetic head, mounted on the head carrier, relative to a track, consists of two capacitors which can be connected to the magnetic head via a change-over switch and which are used to store two consecutive read voltages, and of a differential amplifier which, according to the polarity of a voltage difference, forms a digital voltage step, the amplifier being connected to the two capacitors on the input side and to the control input of the stepping motor on the output side, so that the sense of rotation of said motor can be controlled in dependence on the direction in which the magnetic head moves relative to the track position.

* * * * *